2,967,836
ADHESIVE COMPRISING PHENOL ALDEHYDE RESIN AND WATER DISPERSIBLE GUM

William Richard Moffitt, Stamford, Conn., and Morris B. Berkey, Mercer Island, Wash., assignors to The Borden Company, New York, N.Y., a corporation of New Jersey No Drawing. Filed Nov. 15, 1954, Ser. No. 469,040

4 Claims. (Cl. 260—17.2)

The invention here presented is a new composition of synthetic resins in which a low condensed phenolic-aldehyde resin has incorporated thereinto a galactan-type gum. The gum, in the low condensed resin, retards the penetration of the resin from the glue line of the veneers into the thickness of the veneer sheets during the heat curing and pressing of the resin and controls the penetration of the resin into the fibers in the manufacture of hardboard.

Phenol formaldehyde synthetic resins and other phenol aldehyde resins are well known, and have been made for a long time by either acid or alkali condensation, into and through the "A" stage in which they are water soluble, and into the "B" stage in which they tend to become solids but can be kept in the soluble condition by appropriate treatment. All of these resins are eventually brought to the "C" stage in which they are insoluble and infusible, in which condition they are excellent adhesives, molding compositions and the like.

The present invention presents a series of highly effective and very valuable addition agents to phenol-aldehyde resins in the form of the galactan-type gums such as guar gum or locust bean gum or karaya gum, or the like. The addition of such gums yields a conspicuous and very valuable improvement in the resulting synthetic resins. The presence of the gum does not interfere with the subsequent curing of the resin as an adhesive or for other uses, but compared to a resin of equal condensation without the gum, it is faster curing and the physical properties of the resulting bond are increased both in strength, durability, water resistance and the like without a significant increase in cost of materials or manufacture of the resins. It may be noted that the presence of the gum yields a substantial increase in thickness or viscosity of the resin in the glue line and gives the simultaneous advantages of a much better glue line and a very valuable reduction in cure time. It has the further advantage of permitting the use of a lower molecular weight resin; that is, a less highly condensed resin, without at the same time increasing the cure time, and, in addition, the adhesive so prepared gives a very fast cure on either dry or moist veneer sheets and, at the same time, gives a very long assembly time.

It may be noted also that the galactan-type gum must be added to the mixture before the condensation is completed.

By the composition of the present invention, it is possible, in particular, to prepare a plywood adhesive which sets quickly, such as in 8 minutes at 300° F. on 7/16" construction pressed double at 175 p.s.i., has a good assembly time of at least 30 minutes, and in the application of the gum containing resin glue mix to veneers, it allows the use of a consistently low-spread thickness on the veneer.

Other objects and details of the invention will be apparent from the following description:

In practicing the invention, the first step is the preparation of the phenol formaldehyde condensation mixture. For this purpose, it is found that the formaldehyde to phenol ratio may fall within the range between 1 to 1, up to 3 to 1. The condensation may be started and conducted in the usual way, either acid or alkali condensation being used. To the mixture of reactants there may then be added an appropriate amount of the galactan gum which is preferably added within the range between about 0.1% and 2.5% (based on the amount of phenol used). For commercial resins the preferred percent lies within the range between about 0.25% and 1%. The amount to be used depends in part upon the characteristics of the particular gum chosen and also on the amount of alkaline catalyst used; more gum is required with high alkalinity catalysis. It may be noted also that there is a considerable range of activity among the various available gums, that is, guar gum is perhaps the most effective, with locust bean gum a close second, whereas the karaya gum, while satisfactorily usable, is definitely less effective.

As above pointed out, the preferred gums are the guar gum, locust bean gum and karaya gum, all of which are galactan-type gums. It should be noted also that it is characteristic of these gums that in 1% solution in water, each has a viscosity, higher than "A" on the Gardner-Holdt varnish bubble scale, at 25° C. The three gums above mentioned are the most readily available commercially, and therefore are preferred. There are, however, a substantial number of other galactan-type gums which are not commercially available at the present time which are also usable.

In the incorporation of the gum into the resin, it may conveniently be dissolved in a portion of the phenol or in the water, formaldehyde, or water used in making the original mixture of raw materials, or it may be added to the mixture at any stage from the initial preparation of the mixture onward, provided only that there is a substantial amount of further condensation after the gum is added. Alternatively, if the gum is to be added at a later stage in the reaction, it may be dispersed in an equal weight of furfuraldehyde, and this mixture may then be added either to the initial mixture or to the partially condensed resin.

The exact mode of operation of the gum is not as yet known. It is reasonably sure that the higher viscosity imparted to the adhesive by the presence of the gum is important. In addition, the fact that the gum must be added before the end of the condensation suggests that either the gum is partially co-condensed into the adhesive or that it effects some modification in the character of the condensation obtained, or there may be other effects, especially in view of the unexplained simultaneous increase in assembly time and decrease in cure time. This phenomenon is most unexpected, since the prior art has been strongly of the opinion that an additive which shortened the cure time also seriously shortened the assembly time.

It should be noted that these gums are compatible with a high alkali content and when it is found that a relatively large amount of alkali is advantageous, it may be added at any stage during the condensation which is found to be advantageous. That is, a minimum amount of alkali may be added to the initial mixture, a portion of the condensation completed and then a further amount of alkali added to prevent the mixture from becoming unduly viscous—this is a preferred procedure.

The condensation of the commercial phenolic-aldehyde resin may be carried to a point where the fluidity of the product will allow sufficient storage life during the shipment and use as a liquid resin, and also form a suitable glue mix with filler, water, caustic and soda ash.

The inclusion of a galactan-type gum into the resin adhesive has the added advantage that the same adhesive may be used for either moist or dry veneer plies and shows in either case a minimum of penetration of resin adhesive into the wood. That is, the resin strongly resists absorption into the wood fiber. Furthermore, the amount of penetration of the resin adhesive into the wood is subject to easy control merely by adjustment of the amount of gum added. In addition, the galactan-type gums provided the resin with physical properties which allow a much greater use of fillers and extenders at a consequent reduction in resin glue line cost and still maintain the consistency of good spread control and controlled penetration.

If the resin is desired in other than liquid form, other finishing processes may be utilized. That is, any excess moisture may be distilled off, the resin acidified either before or after distillation to halt the condensation reaction and the kettle may then be dumped as desired.

As so prepared, the resin is suitable for a wide range of uses. It is particularly advantageous for bonding wood laminations to produce plywood boards. It is suitable for bonding operations of any sort such as the manufacture of furniture, buildings, boats and the like. It is also readily precipitated upon paper fibers especially during the laying operation, to yield a paper having a very important dry strength and an excellent wet strength. It is likewise highly valuable for use as a core binder in which the long assembly time and cure time are very helpful. It is also excellently suited to use in the so-called "Croning process" of shell molding and, in addition, it is an excellent adhesive for bonding cloth, paper and the like together, or to other substances.

It is to be noted that the resin adhesive has a very good flow because of the fact that it can be prepared in relatively low molecular weight, yet at the same time, the penetration is sharply reduced because of the high viscosity imparted to the resin by the gum.

The resulting resin is easily prepared in a grindably hard condition whereby the resin discharged from the kettle is cooled, crushed, pulverized and packaged for use. Alternatively, the resin may be spray dried without prior distillation of excess moisture and packaged in the spray dried condition. If the amount of moisture present is considerable, the resin may be precipitated from the water solution by the addition of appropriate amounts of acid, after which the precipitated resin may be strained out, dried and packaged as desired.

The resin as so prepared is then suitable for shipment in the dried condition, and it may readily be dissolved in an appropriate amount of water to prepare a very satisfactory adhesive. It is found that the adhesive spreads very well under a condition of relatively high viscosity and there is a minimum of penetration into the wood veneer during the making of plywood.

Appropriate amounts of any of the usual fillers may be added to the dissolved resin either by mixing into the dry pulverized resin before dissolving, or into the dissolved resin. The resin of the present invention will accept satisfactorily relatively very high quantities of fillers, and it is practically always used with a more than average amount of fillers. However, it can also be used without fillers or with small amounts of fillers if desired. The preferred fillers are such substances as walnut shell flour, or the ground Douglas fir bark, known to the trade as "Silvacon 472" which is prepared by a rather elaborate purification process to yield a particularly advantageous filler. This process consists of a fractionation procedure applied to the ground bark by which the oversize and undersize portions and some components are removed. Also, the loss of moisture by absorption into wood is minimized by the low penetration properties, with the result that the assembly time is unusually long, even though the veneer plies may be very dry or warm. These assembly times may easily be as much as 50% greater in length than the best assembly times obtainable with the present highly alkaline, highly condensed resins.

It may be noted that the resin prepared according to the present invention shows a very excellent shelf life which may run from several months to a year or more.

The principal utility of the resins of the present invention is the use as plywood adhesives, for which purpose they are outstandingly superior as above pointed out, but they are also useful for almost any of the synthetic resin purposes either as molding compositions or as casting resins or the like, the resin being particularly useful for the making of "dry fiber hard board" structures in which it plays the part of the binder.

*Example I*

Boards as produced in the laboratory, for example, using 2⅓% of the present resin and 2½% petrolatum wax have shown the following properties:

| | |
|---|---|
| Specific gravity | 1.80 |
| Modulus of rupture p.s.i. | 6000 |
| Water abs. (24 hr. soak) percent | 10.9 |
| Swell in thickness do | 11.3 |

This is an average value for modulus of rupture but very good for water absorption and swell.

*Example II*

A further example of a use for this type of resin in processes where pulp or wood fibers are slurried in water and the resin precipitated by acidification is shown in the following example which was designed for this type of application.

This procedure is found in the following method in which the initial condensation mixture is prepared as follows:

| Materials: | Parts by weight |
|---|---|
| (1) 37% formaldehyde | 42.68 |
| (2) Water | 1.25 |
| (3) Locust bean gum | 0.13 |
| (4) U.S.P. phenol (40° C. M.P.) | 24.99 |
| (5) Water | 3.75 |
| (6) 50% caustic soda solution | 2.50 |
| (7) 50% caustic soda solution | 11.87 |
| (8) Water | 12.84 |

(1), (2) and (3) are charged to the resin kettle and mixed 10 minutes. (4), (5) and (6) are added and the batch is heated to 85° C. Viscosity measurements are made on the resin by the Gardner-Holdt scale at 25° C. When a viscosity of "H" on this scale is reached, the batch is cooled to 70° C. where it is held until a Gardner "T" is reached. Cooling is begun and when the temperature has fallen below 60° C., (7) and (8) are added. The batch is cooled below 30° C. before dropping from the kettle.

The resulting product has the following properties:

| | |
|---|---|
| Viscosity | 172–200 cps. @ 25° C. |
| pH | 11.25–11.50. |
| Specific gravity | 1.190–1.193 @ 25°/25° C. |
| Solids | 39–41.5%. |
| Dilutability (water @ 25° C.) | Infinite. |

This also is an excellent resin adhesive.

Boards prepared in this manner with the above adhesive gave the following average results using 1½% resin solids (based on dry fiber weight as 100%):

| | |
|---|---|
| Specific gravity | 1.16 |
| Modulus of rupture p.s.i. | 8300 |
| Water abs. (24 hr. soak) percent | 24.3 |
| Swelling do | 19.5 |

This represents unusually good modulus. Water resistance and swell are also good, considering that paraffin wax was purposely left out of these boards. By comparison, current hardboard resins for wet strength usually give about 6000–7000 p.s.i. and about 40% water absorption and 25% swelling when tested in the absence of wax.

Example III

In the preparation of a typical resin according to the present invention, the following procedure was followed:

Materials: Percent (by weight)
- (1) U.S.P. phenol (40° C. M.P.) ---------- 30.17
- (2) 37% formaldehyde ------------------ 51.54
- (3) Water ----------------------------- 6.07
- (4) Locust bean gum ------------------- 0.15
- (5) 50% caustic soda solution ---------- 5.28
- (6) 50% caustic soda solution ---------- 6.79

(1), (2), (3), (4) and (5) were charged to the resin kettle and heated to reflux. After 15 minutes at reflux, the temperature was cooled to 85° C. where it was held until the resin had condensed to a viscosity of "S" on the Gardner scale when measured at 25° C. The batch was then cooled to 70° C., (6) was charged and the resin reheated to 75-80° C. where it was held until it had condensed to a "W." It was then cooled to below 30° C. and dropped from the kettle.

This product has these properties:

Viscosity ----------------- 1900–2000 cps. @ 25° C.
pH ----------------------- 10.8–11.2.
Solids -------------------- 47.0–48.5%.
Dilutability -------------- Infinite.

The above procedure is a typical one for the making of a resin according to the present invention.

Example IV

Still another excellent procedure is found in the following mixture and schedule:

Materials: Percent (by weight)
- (1) 37% formaldehyde ------------------ 55.17
- (2) Water ----------------------------- 5.70
- (3) Locust bean gum ------------------- 0.09
- (4) U.S.P. phenol --------------------- 33.66
- (5) 50% caustic soda solution ---------- 3.03
- (6) 50% caustic soda solution ---------- 2.35

100.00

The processing of this resin is as follows: (1), (2) and (3) are placed in the resin kettle and mixed 10 minutes. (4) and (5) are added and the resin is heated to 85° C. It is held at this temperature until it has condensed to a viscosity of Gardner "H" when measured at 25° C. It is then cooled to 70° C. and condensed to a Gardner "T." At this point the batch is cooled and when the temperature has dropped below 60° C., (6) is added. Cooling is continued to below 30° C. after which the resin is dropped from the kettle.

This resin has these properties:

Viscosity ----------------- 750–1200 cps. @ 25° C.
pH ----------------------- 9.2–9.5.
Specific gravity ---------- 1.172–1.176 @ 25°/25° C.
Solids -------------------- 46.5–48.5%.

Example V

Still another excellent resin is obtained from the following mixture treated as below:

Materials: Percent by weight
- Meta para cresol ------------------------ 54.48
- 50% caustic ----------------------------- 0.55
- Guar gum ------------------------------- 0.07
- 37% formaldehyde ----------------------- 40.86
- Solox ---------------------------------- 4.04

The guar gum is dispersed in the cresol and then the 50% caustic and 37% formaldehyde are added. The materials are heated to reflux and held for 15 minutes. The temperature is then reduced to 90° C. until a cloud point at 90° C. is obtained. After cooling, 14.80% of water is removed by vacuum distillation. After addition of the Solox a range of viscosity of 150-200 cps. @ 25° C. is obtained.

Solox is a solvent consisting of 100 parts of specially denatured alcohol, 5 parts of ethyl acetate and 1 part of aviation gasoline.

Example VI

Another excellent resin is prepared from the following components by the processes schedule shown.

Materials: Percent by weight
- U.S.P. phenol --------------------------- 34.67
- Water ---------------------------------- 5.87
- 37% formaldehyde ----------------------- 53.85
- Guar gum ------------------------------- .07
- 50% caustic ----------------------------- 3.09
- 50% caustic ----------------------------- 2.45

The guar gum is dispersed in the phenol and water and then 37% formaldehyde and 3.09 parts of 50% caustic is added. The materials are heated to 85° C. and held until a Gardner "F" is reached. The resin is then cooled to 70° C. and the 2.45 parts of 50% caustic are added. Continued cooling is maintained until below 30° C. Viscosity range 660 to 780 cps. @ 25° C.

Example VII

The locust bean gum shown in Examples V and VI may be replaced, weight for weight, by guar gum, and the materials are charged and heated in the same order and manner except the resin is taken to a Gardner "S" before cooling and adding the last caustic, and closely similar results are obtained.

Example VIII

Karaya gum is likewise excellently useful as in the following mixture using a processing schedule as shown:

Materials: Percent by weight
- U.S.P. phenol --------------------------- 23.38
- Water ---------------------------------- 3.49
- 37% formaldehyde ----------------------- 44.43
- 50% caustic ----------------------------- 4.21
- Karaya gum ----------------------------- .23
- 50% caustic ----------------------------- 9.82
- Water ---------------------------------- 14.44

Karaya gum is dispersed in the phenol and 3.49 parts water. Then the 37% formaldehyde and 4.21 parts 50% caustic are added. The materials are heated to reflux and held 15 minutes and cooled to 85° C. and condensed at 85° C. to a Gardner "S." The resin is cooled to 65° C. and the 9.82 parts 50% caustic, and the 14.44 parts water are added. The resin is further condensed at 85° C. to a Gardner "L," then cooled below 30° C. Viscosity range 283–313 cps. @ 25° C.

Example IX

An excellent procedure using guar gum is shown in the following formula and processing schedule:

Materials: Percent by weight
- U.S.P. phenol --------------------------- 19.10
- Water ---------------------------------- 2.85
- 37% formaldehyde ----------------------- 54.94
- Guar gum ------------------------------- .10
- 50% caustic ----------------------------- .96
- 50% caustic ----------------------------- 12.00
- Soda ash -------------------------------- 1.91
- Water ---------------------------------- 8.14

Disperse the guar gum in the 2.85 parts water and U.S.P. phenol. The 37% formaldehyde and .96 part 50% caustic are then added. The materials are heated to reflux until a cloud point at 45° C. is obtained. The resin is cooled to 50° C. and the remaining materials are added. Temperature is held at 70° C. until a Gardner "G" is reached. Cool below 30° C. Viscosity range 425–515 cps. @ 25° C.

The approximate total water content of the compositions, as calculated from the data given in certain examples, for 1 part of the phenol used, the viscosity on the Gardner-Holdt varnish bubble scale after the first condensation step and before additional alkali is added, and the viscosity of the finished resin solution of the said water content are shown in the following table:

| Example No. | Water, parts for 1 part of the Phenol | Viscosity of Solution | |
|---|---|---|---|
| | | Gardner-Holdt, after 1st Cond. Step | Final cps. |
| II | 2.28 | H | 172–200 |
| III | 1.47 | S | 1,900–2,000 |
| IV | 1.27 | T | 750–1,200 |
| VI | 1.22 | F | 660–780 |

The maximum and minimum proportions of the sodium hydroxide on the dry basis for the second addition are approximately as shown in the following table.

| Example No. | Sodium Hydroxide Added, Parts by Weight for 100 of Phenol, Second Addition, i.e., After Initial Condensation |
|---|---|
| II | 23.7 |
| III | 11.3 |
| IV | 3.5 |
| VI | 3.5 |
| I | 31.4 |

The above examples are representative of the three preferred gums. Others which may be used are similarly operative with minor changes in preparation only.

While there are above disclosed but a limited number of embodiments of the composition and process of the present invention, it is possible to provide still other embodiments without departing from the inventive concept herein disclosed.

The invention claimed is:

1. An adhesive comprising (1) a water soluble, further condensable product of the alkali-catalyzed condensation of 1–3 moles of formaldehyde with 1 mole of a phenol selected from the group consisting of phenol and cresol, the phenol and formaldehyde being so condensed in contact with a water dispersible gum selected from the group consisting of locust bean, karaya, and guar gums, and (2) sodium hydroxide serving as catalyst of further condensation of the resulting product, the proportions being about 0.1%–2.5% of the gum and 3.5%–31.4% of sodium hydroxide on the weight of the selected phenol, the said sodium hydroxide being in addition to the alkali catalyst of the said condensation, and the gum serving to decrease the penetration of the adhesive composition when applied to wood, increase the permissible assembly time with the adhesive, and decrease the time required for curing at the elevated temperatures of curing thereof.

2. The adhesive of claim 1, the selected phenol being phenol.

3. The adhesive of claim 1, the said gum being locust bean gum.

4. The adhesive of claim 1, including 1.2–2.28 parts by weight of water to 1 of the selected phenol.

References Cited in the file of this patent

UNITED STATES PATENTS

| 1,807,545 | Ostersetzer et al. | May 26, 1931 |
| 1,855,384 | Cheetham | Apr. 26, 1932 |
| 2,245,245 | Alexander | June 10, 1941 |
| 2,357,091 | D'Alelio | Aug. 29, 1944 |
| 2,411,557 | Schuh | Nov. 26, 1946 |
| 2,570,892 | White | Oct. 9, 1951 |

FOREIGN PATENTS

| 974,264 | France | Sept. 27, 1950 |